United States Patent [19]
Kruger

[11] Patent Number: 4,937,847
[45] Date of Patent: Jun. 26, 1990

[54] ENHANCEMENT SYSTEM AND METHOD FOR X-RAY IMAGING

[75] Inventor: Robert A. Kruger, Salt Lake City, Utah

[73] Assignee: Innovative Imaging Sciences, Inc., Salt Lake City, Utah

[21] Appl. No.: 348,747

[22] Filed: May 10, 1989

[51] Int. Cl.⁵ .............................................. G03B 42/04
[52] U.S. Cl. ...................................... 378/62; 378/167; 378/185
[58] Field of Search ................. 378/62, 167, 185, 186, 378/187

[56] References Cited

U.S. PATENT DOCUMENTS 2,120,908  6/1938  Raney .
2,640,160  11/1950  Collins et al. .
4,179,100  8/1977  Sashin et al. .
4,350,889  9/1982  Lisnyansky ............................ 378/46

Primary Examiner—Craig E. Church
Attorney, Agent, or Firm—Martin M. Novack

[57] ABSTRACT

A method and system are disclosed for producing a photographic image of an X-ray pattern, including the following steps: converting the X-ray pattern to a first pattern of light; exposing a photographic film to said first pattern of light; detecting the light at elemental regions of the first pattern; generating a second pattern of light in a pattern which depends on the detected light; and exposing the photographic film to the second pattern of light. The generating of the second pattern of light includes generating light from a one-dimensional array of light emitters, and moving the array with respect to the photographic film. The disclosed invention provides improvement on the standard radiographic method in the following ways: (1) The recorded film contrast in low X-ray exposure regions that ordinarily would have been recorded in under-exposed regions on a film's characteristic curve will be increased significantly. (2) The overall range of light transmission that must be viewed by the radiologist will be decreased without sacrificing diagnostic information.

14 Claims, 15 Drawing Sheets

PRICE ART

ENHANCEMENT SYSTEM AND METHOD FOR X-RAY IMAGING

BACKGROUND OF THE INVENTION

This is a continuation-in-part of my copending U.S. patent application Ser. No. 197,708, filed May 23, 1988. The subject matter of this application is related to subject matter disclosed in my U.S. patent application Ser. No. 348,748, filed even date herewith, and assigned to the same assignee as the present application. This invention relates to the field of radiography and, more particularly, to an improved method and apparatus for producing images of X-ray patterns, also called X-ray images.

As shown in FIG. 1, conventional radiography employs a source of X-rays 10 that are directed toward the anatomical region of a patient 101 that is to be examined. The number and energy of the X-rays employed are together referred to as the X-ray exposure. Part of this X-ray exposure is absorbed or scattered by the patient, and part passes through the patient and strikes the X-ray detector. Since the number of X-rays that pass through different regions of the patient differ due to differences in the nature and density of the constituent organs within the patient, the X-rays that are detected form a pattern or "shadow image" indicative of the relative densities of the tissues within the patient. In conventional radiography, this shadow image is recorded using a screen/film combination as the detector.

The typical screen/film detector works in the following way. One or two fluorescent screens, such as 121 and 122 in FIG. 1, are placed in contact with a piece of light-sensitive film, 125. The film 125 is relatively insensitive to X-ray exposure, while the screen(s) 121, 122 are highly sensitive to X-ray exposure. The combination of screen(s) and film are typically placed in a light-tight cassette (not shown) that is composed of low density material that produces little interaction with the x-rays. The X-rays that pass through the patient are partially absorbed by the first screen, which typically contains high density, high atomic number materials, such as tungsten, or rare earth elements such as gadolinium or lanthanum. Part of the X-ray energy that is absorbed by the first screen is converted into light (fluorescence), which then exposes the film. If a second screen is used, additional fluorescent light is produced in response to the further absorption of X-rays that passed through the first screen and impinged on the second screen; thereby increasing the sensitivity of the detector system.

After the X-ray exposure has been completed, the film is removed from the cassette and developed, typically using standard photographic film development techniques. The developed film looks like a film "negative" and is called a "radiograph." The developed radiograph contains a pattern of film darkening representative of the distribution of tissue densities within the patient being examined.

For any screen/film system, there exists a quantitative relationship between the amount of X-ray exposure absorbed by the screen(s) and the amount of film darkening produced. This relationship is represented in FIG. 2, the solid-line curve of which is a plot of the amount of film darkening (optical density, O.D.) produced versus the logarithm of the amount of X-ray exposure detected, LOG(E). This curve is generally referred to as either the "characteristic" or "H and D" curve. In the example of FIG. 2, the curve shown is the characteristic curve for a common X-ray film, Kodak XL-1.

The shape of the characteristic curve strongly affects the final appearance of the radiograph. For example, the steeper the curve, the greater incremental film darkening (contrast) is produced in response to an incremental increase in X-ray exposure. The slope (or gamma) of the characteristic curve is also plotted (dashed-line curve) as a function of LOG(E) in FIG. 2.

In general, it is desirable to record an image using an amount of X-ray exposure that will place the recorded film darkening near the region of steepest slope (highest gamma). Since the range of X-ray exposures recorded on a single film is great (often a factor of 50 to 100), however, one cannot have all regions of the film recorded near the region of highest slope, unless a film with relatively lower overall slope (so-called "high latitude" film) is used. The disadvantage to this approach, however, is that the radiograph produced tends to be too low in overall contrast. For this reason, films are used whose maximum slopes are in the range between about 2.5 and 3.0, and X-ray exposures are employed so that most, but not all, of the film darkening occurs near the region of highest slope. As a result, under-exposed and over-exposed regions are recorded with inferior contrast as compared to the regions recorded near highest slope. These two inferior regions are referred to as the "toe" and "shoulder" of the characteristic curve.

Another feature of radiographic films produced using standard techniques is that a very wide range of light is transmitted through a radiograph when viewed. If, for example, the range of optical densities recorded on a film is 2.0 O.D. units, a factor of 100 ($10^2$) in light transmission results. This means that a factor of 100 in light levels must be simultaneously viewed by the radiologist when examining the film to make a diagnosis. This range of light intensities exceeds what can be viewed comfortably by the human eye. Regions of high transmission (low optical density) contribute glare, in much the same way as headlights of approaching cars produce glare when driving at night. This glare impairs the radiologist's ability to visualize subtle detail in the darker regions of a radiograph. It is among the objects of the present invention to provide solution to the above-described problems and limitations of prior art techniques.

SUMMARY OF THE INVENTION

The invention disclosed in my above referenced U.S. patent application Ser. No. 197,708 provides, inter alia, improvement on the standard radiographic method in the following ways:

1. The recorded film contrast in low X-ray exposure regions that ordinarily would have been recorded in under-exposed regions of a film's characteristic curve will be increased significantly.

2. The overall range of light transmission that must be viewed by the radiologist will be decreased without sacrificing diagnostic information.

In accordance with an embodiment disclosed in my above referenced Application Ser. No. 197,708, there is set forth a method for producing a photographic image of an X-ray pattern, including the following steps: converting the X-ray pattern to a first pattern of light; exposing a photographic film to said first pattern of light; detecting the light at elemental regions of the first pattern; generating a second pattern of light in a pattern which depends on the detected light; and exposing said photographic film to said second pattern of light.

In one form of this embodiment, the step of detecting light at elemental regions of said first pattern of light includes detecting the light intensity at said elemental regions, and the step of generating a second pattern of light includes generating a pattern of light having the following characteristics:

(i) for elemental regions corresponding to elemental regions of the first pattern of light having a light intensity above a predetermined threshold, the light intensity of the respective elemental regions of the second pattern being substantially zero; and (ii) for elemental regions corresponding to elemental regions of the first pattern of light having a light intensity below the predetermined threshold, the respective elemental regions of the second pattern having intensities inversely related to the intensities of the corresponding elemental regions of the first pattern of light.

As used herein, the term "inversely related" means that as one of the related quantities (of intensity, time, etc.) is increased the other is decreased, or vice versa. The increase or decrease need not be inversely proportional.

In another form of the embodiment disclosed in my above referenced application Ser. No. 197,708, the step of generating a second pattern of light includes generating a pattern of light having the following characteristics:

(i) for elemental regions corresponding to elemental regions of the first pattern of light having a light intensity above a predetermined threshold, the light of respective elemental regions of the second pattern being present for substantially zero time; and (ii) for elemental regions corresponding to elemental regions of the first pattern of light having a light intensity below the predetermined threshold, the respective elemental regions of the second pattern having light which is present for times which are inversely related to the intensities of the corresponding elemental regions of the first pattern of light.

An embodiment of an apparatus as disclosed in my above referenced application Ser. No. 197,708 is applicable for use in an X-ray imaging system for obtaining an image of the X-ray transmissivity of a body, and which includes a source of X-rays directable at the body, at least one X-ray sensitive screen for receiving X-rays transmitted through the body and converting received X-rays to light, and means responsive to light from the screen for producing an image. The improvement as disclosed in my above-referenced application Ser. No. 197,708, for use in this imaging system, is a light enhancing subsystem which includes means for detecting the amount of light emanating from elemental regions of the X-ray sensitive screen. Means responsive to the detecting means are then provided for generating enhancing light to enhance the light from those elemental regions of the screen which are below a predetermined light threshold, the enhancing light also being received by the image producing means. In a form of said embodiment, the means for producing light for enhancing the light emanating from at least some of the respective elemental regions is operative to produce an amount of light exposure on the image producing means that is in an inverse relationship to the amount of light detected by the detecting means from the respective corresponding elemental regions. In a disclosed form of said embodiment, the light detecting means includes an array of light detecting devices, and the means for producing enhancing light includes an array of light emitting devices. These arrays can be mounted in a cassette holder which is adapted to removably receive a film cassette which includes at least one X-ray sensitive screen and an adjacent photographic film.

Among further advantages of the invention disclosed in my above referenced application Ser. No. 197,708 are that it can employ conventional screens, film, and X-ray exposure procedures, and that the operation thereof requires no modification of radiographic technique, and no significant increase in procedure time.

In accordance with the improvement of the present invention, a one-dimensional array is utilized to generate the second pattern of light. The one-dimensional array is moved with respect to the photographic film; i.e., by moving the film, the array, or both. In the illustrated embodiment the film is stationary, and the one-dimensional array is moved, in stepped fashion, with respect thereto. Continuous motion with respect to the film could alternatively be utilized. The use of a one-dimensional array reduces cost and increases reliability as compared to a two-dimensional array.

Further features and advantages of the invention will become more readily apparent from the following detailed description when taken in conjunction with the accompanying drawings.

DESCRIPTION OF THE PREFERRED EMBODIMENTS

Consider a section of a radiographic film that has been underexposed to X-rays. Were this section of the film to be developed, the resultant film darkening would be low, as would be the recorded contrast. For purposes of discussion, call the amount of X-ray exposure $E_1$ and the amount of film darkening produced $D_1$. In this case, the recorded film contrast $C_1$ is given by:

$$C_1 \gamma(E_1) \Delta E / E_1. \tag{1}$$

The quantity E might represent, for example, an incremental change in transmitted X-ray exposure due to the presence of a small lung nodule. These quantities are shown schematically in FIG. 3.

Figure 3:
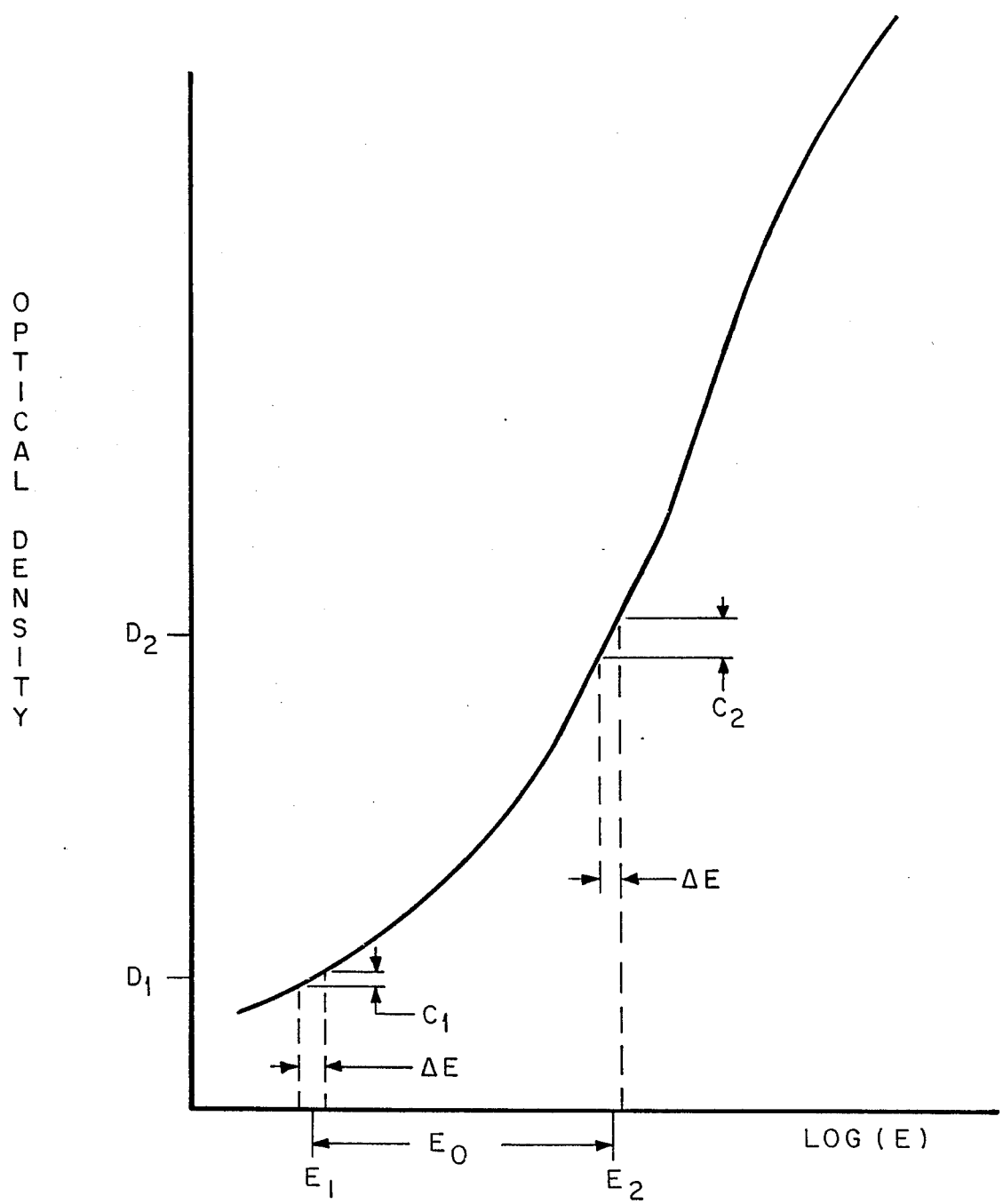
FIG. 3 is another characteristic curve of optical density versus X-ray exposure which is useful in understanding the theory hereof.

If, however, the underexposed region of the film were exposed to an additional amount of light (i.e., from a light source, not from additional X-ray exposure) prior to development, the resulting film would be made artificially darker in the region where the incremental X-ray exposure E had been recorded. In this case, the amount of film darkening would be $D_2$, in response to an amount of light exposure $E_2$, where $E_2$ would be due partially to X-ray exposure $E_1$ and partially due to the additional light exposure $E_O$, i.e., $E_2 = E_1 + E_O$, as is shown in FIG. 3. In this case, the recorded film contrast would be given by:

$$C_2 = \gamma(E_2) \Delta E / E_2. \tag{2}$$

The expression for $C_2$ is interpreted to mean that the additional light exposure increases film contrast because the incremental X-ray exposure is moved to a steeper region of the film's characteristic curve, i.e., $\gamma(E_2) > \gamma(E_1)$. Since, however, the light exposure contains no detailed information about the patient being examined, some radiographic contrast is lost, because $\Delta E/E_2 < \Delta E/E_1$. A net improvement in recorded film contrast can be realized if $C_2 > C_1$. This will be the case so long as $[\gamma(E_2)/\gamma(E_1)] [E_1/E_2] > 1$.

For typical radiographic films, this is the case in regions where the recorded optical density would be less than about 0.50 to 0.75, using a typical radiographic screen/film technique. In regions of the film where recorded film darkening would be less than about 0.50 to 0.75 O.D. units, an improvement in the recorded film contrast can be realized by adding additional light exposure to these regions of the film prior to film development.

Figure 2:
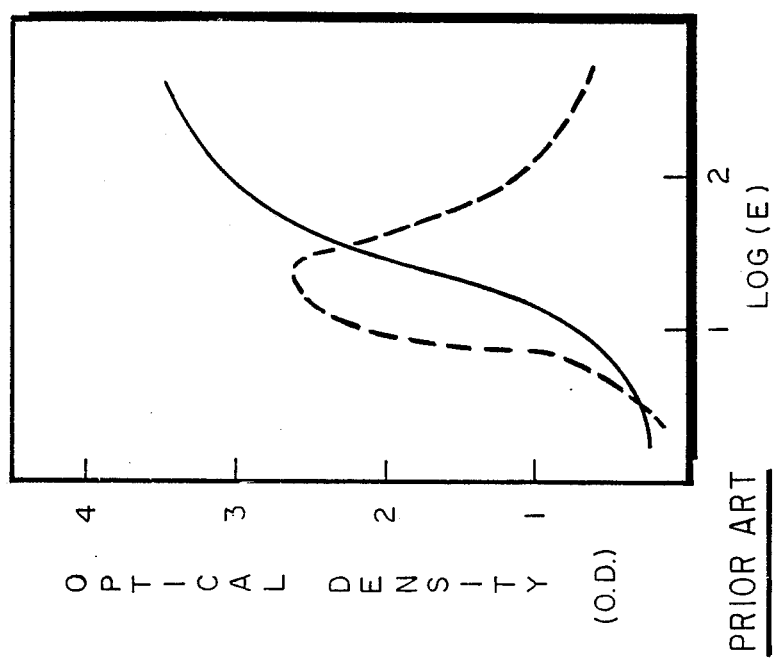
FIG. 2 shows a characteristic of optical density versus the log of X-ray exposure for a common X-ray film.
Figure 1:
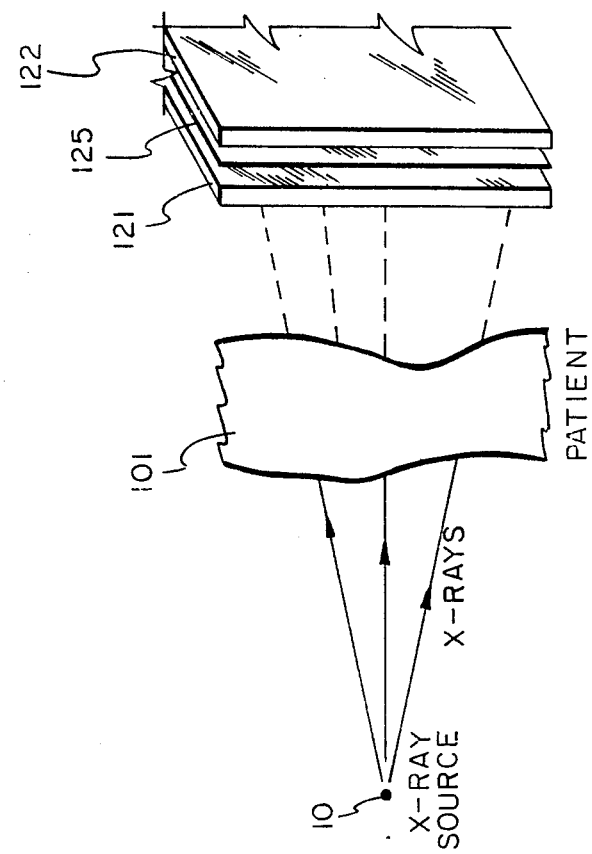
FIG. 1 is a simplified schematic diagram of a prior art X-ray imaging system.
Figure 4:
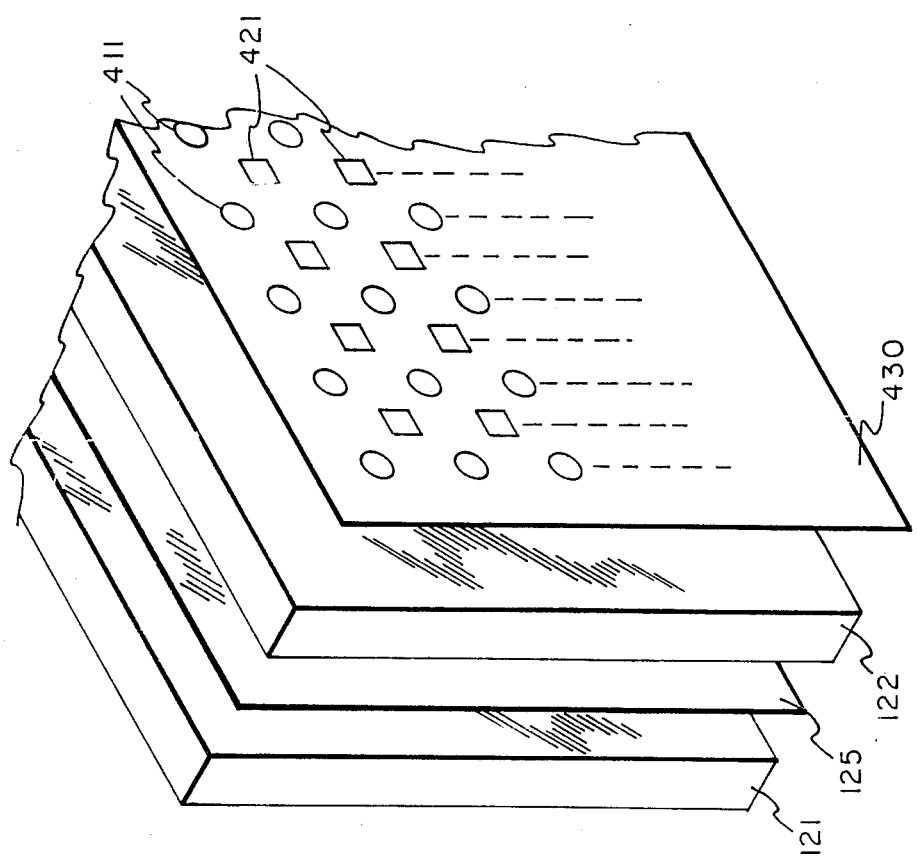
FIG. 4 is a diagram of a portion of a light-enhancing subsystem in accordance with an embodiment as disclosed in my above-referenced application Ser. No. 197,708.

The principle as disclosed in my above-referenced application Ser. No. 197,708 is illustrated in the simplified diagram of FIG. 4. In this illustration, the fluorescent screens 121 and 122 and the light-sensitive film 125 are in a conventional configuration, as first shown in FIG. 1. These elements are typically mounted in a light-tight enclosure, such as a cassette (see e.g. FIG. 15 below). Also within the light-tight enclosure, and positioned adjacent screen 122 in this illustration, is an array of light detectors (shown as small circles 411) and an interdigitated array of light emitters (shown as small squares 421) all mounted on a support sheet 430. The nature of the light detectors and light emitters, and the circuitry to which they are coupled, will be described hereinbelow. The purpose of the light detectors is to indirectly measure the regional variations in X-ray exposure that have been made to the film during the X-ray exposure. The purpose of the light emitters is to add sufficient regional light to bring the level of eventual film darkening up to some predetermined level in those regions of the film that received insufficient X-ray exposure.

The two-dimensional array of light detectors, and their associated circuitry (to be described), work in the following way. During the X-ray exposure, the fluorescent screens emit light in proportion to the amount of absorbed X-ray exposure. A portion of this light from screen 122 would be emitted from the backside of the screen and reach the array of light detectors 411. Each light detector is preferably located so that light predominantly from a moderate size elemental area, e.g., 2 to 10 $cm^2$, would reach it. [As used herein, the terms "elemental region" or "elemental area" generically denote a region or area that is a fraction of the overall size of the area or cross-section referred to.] The array of light detectors is arranged so that it is responsive overall to light emitted from the entire area of the film. Each light detector produces an electrical current in response to the light that reaches it. As will be described, the electric current is integrated during the X-ray exposure, using a charge storage device such as a holding capacitor. During the exposure each holding capacitor is charged to a voltage $V_i$, which is proportional to the amount of X-rays that had been absorbed within the area of the fluorescent screen "viewed" by its associated light detector. Thus, at the end of the X-ray exposure, the charge storage device associated with each light detector will have recorded a voltage ($V_i$) representative of the regional level of X-ray exposure.

Each of the light emitters 421 is controlled as a function of the voltage that had been stored by a nearby (or associated or corresponding) light detector (or detectors, if desired) during the X-ray exposure. Following termination of the X-ray exposure, in one form of the invention, a voltage $V_O-V_i$ (for $V_O-V_i>0$) is used to turn "on" each light emitter for a period of time $\Delta T$. The intensity of the light produced is proportional to $V_O-V_i$. If $V_O-V_i<0$, the associated light emitter is not turned on. The values of $V_O$ and/or $\Delta T$ are chosen to correspond to a predetermined level of film darkening.

Figure 5:
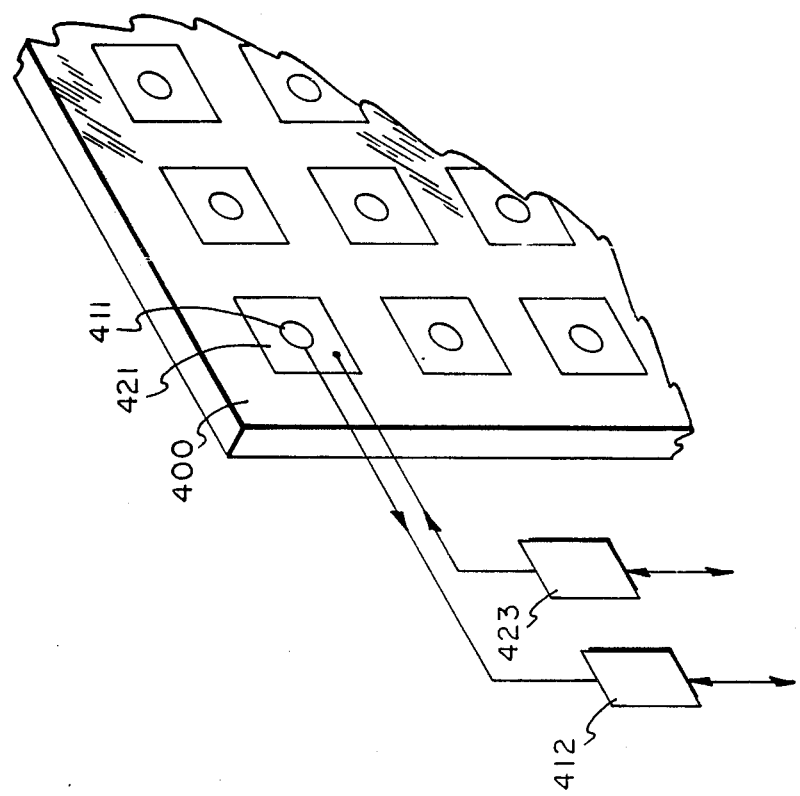
FIG. 5 is a diagram, partially in block form, of a portion of a light enhancing subsystem in accordance with an embodiment as disclosed in my above-referenced application Ser. No. 197,708.
Figure 8:
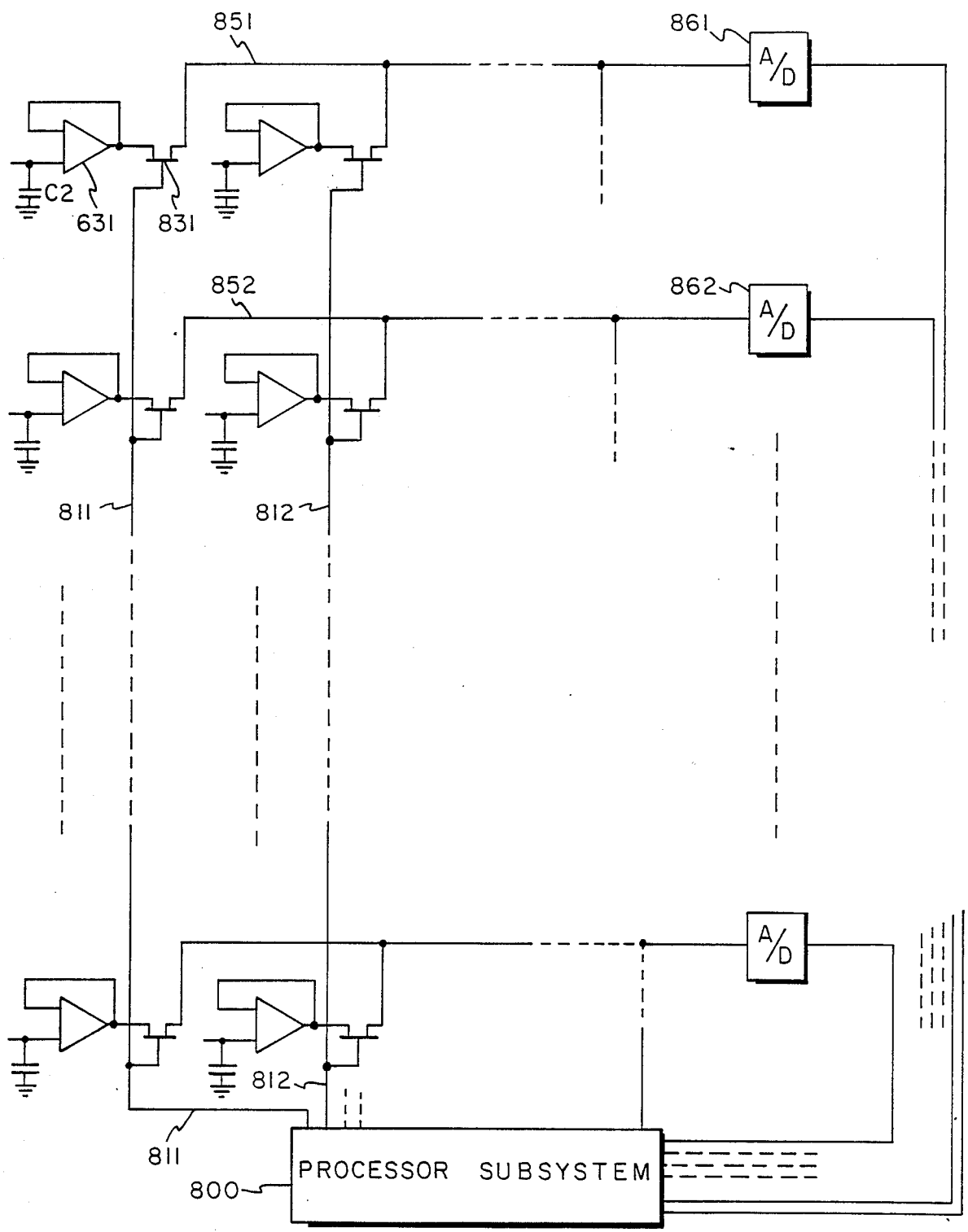
FIG. 8 is a schematic diagram, partially in block form, of an embodiment of the circuit for obtaining stored signals representative of light detected at individual elemental regions.

Referring to FIG. 5, there is shown an embodiment of the light enhancement subsystem as disclosed in my above referenced application Ser. No. 197,708, which comprises a supporting sheet (e.g. 430 in FIG. 4) on which are mounted an array of light detectors 411 and an array of light emitters 421. In the illustrated embodiment, the support sheet 430 is plastic, the light detectors 411 are photodiodes with associated circuitry 412, and the light emitters 421 are electroluminescent devices (e.g. panels) with associated circuitry 423. The wiring to array elements and any circuit components mounted with the array can be in the vertical and/or horizontal spaces between array elements or behind the plastic sheet. It will be understood, however, that any suitable light-detecting and light-emitting devices can be employed, consistent with the principles hereof. In the FIG. 5 arrangement, the photodiode 411 of each array position is located in the center of the electroluminescent panel section 421 for the corresponding array position. The photodiodes can be mounted on the respective electroluminescent panel sections on the side of sheet 430 that faces the screen 122 (FIG. 4), which is substantially transparent to the light. In the present embodiment, the circuits 412 and 423 are coupled, via circuitry to be described, to a processor subsystem (FIG. 8).

Figure 6:
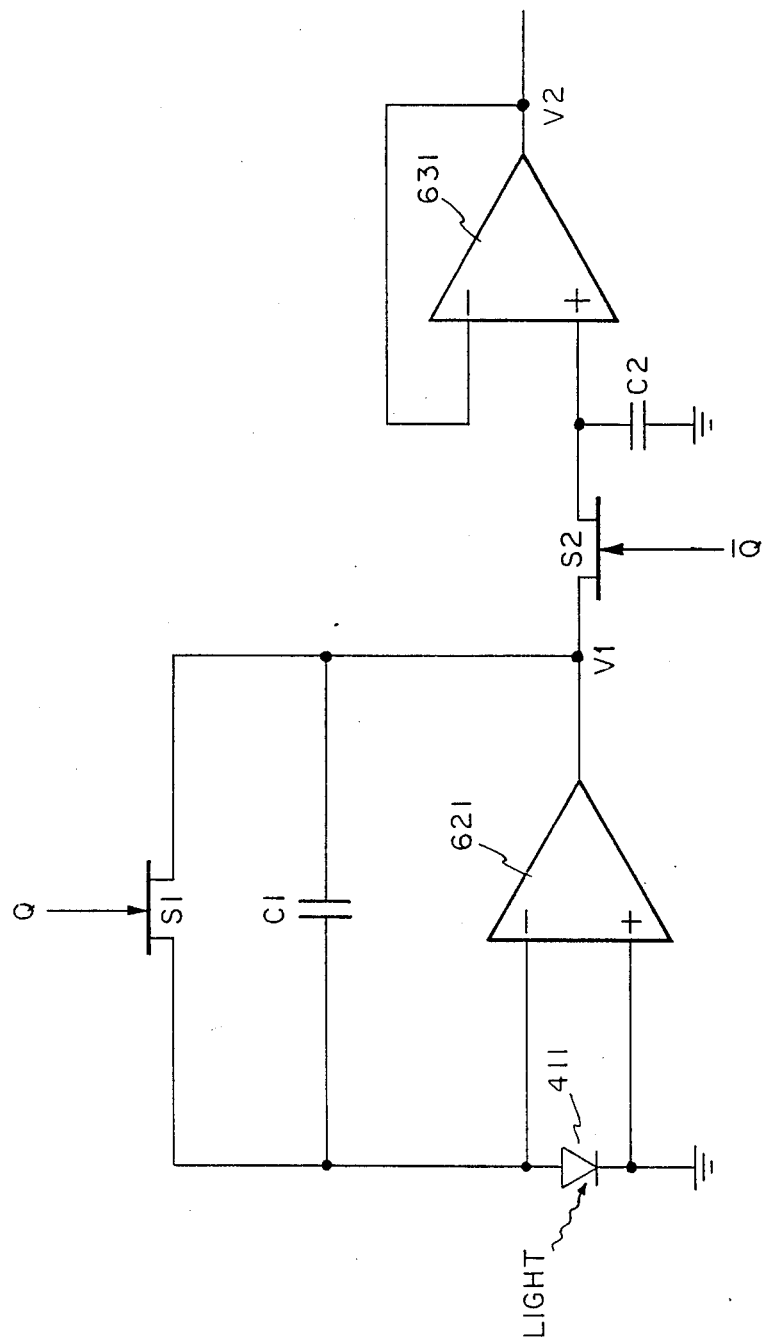
FIG. 6 is a schematic diagram of a light detecting device and associated circuitry in accordance with an embodiment as disclosed in my above referenced application Ser. No. 197,708.

FIG. 6 illustrates the circuitry 412 associated with each light detecting device in the described embodiment. Some or all of the circuitry can be located at the position of the associated photodiode in the array, or can be separate from the array. The photodiode 411 is coupled across the input terminals of an operational amplifier 621, the positive input terminal of which is grounded. A switch S1 is coupled between the negative input terminal and output terminal of the operational amplifier 621, and a capacitor C1 is coupled in parallel with the switch. In this embodiment, as disclosed in my above-referenced application Ser. No. 197,708, the switch S1 is a field-effect transistor, the gate of which receives a signal designated as Q.

The output of operational amplifier 621 is coupled, via switch S2, to the positive input terminal of another operational amplifier 631. The switch S2 is also a field-effect transistor, the gate of which controlled by signal $\overline{Q}$; that is, the opposite sense of the previously indicated signal Q. A holding capacitor C2 is coupled between the output of switch S2 and ground. Also, the output of operational amplifier 631 is coupled to the negative input terminal of the operational amplifier 631.

In operation of the circuit of FIG. 6, when X-ray exposure begins, the signal Q will cause switch S1 to open and light which reaches photodiode 411 causes charge to build up across capacitor C1 and a voltage to build up at the output of operational amplifier 621. By the time X-ray exposure is completed, a voltage V1 will appear at the output of operational amplifier 621, where V1 represents the integrated intensity of the light received at photodiode 411 (and, accordingly the level of X-ray exposure for the corresponding region of the X-ray pattern, which results in this light). At the initiation of X-ray exposure, $\overline{Q}$ causes switch S2 to close, so that the voltage S2 is impressed on the holding capacitor C2. At termination of X-ray exposure, $\overline{Q}$ causes S2 to open, disconnecting holding capacitor C2 from the output of operational amplifier, and Q causes S1 to close, discharging capacitor C1. The input impedance of operational amplifier 631 is relatively large, so C2 does not discharge quickly. As will be described below, the voltage V1 stored in C2 is read out shortly after the X-ray exposure terminates.

Figure 7:
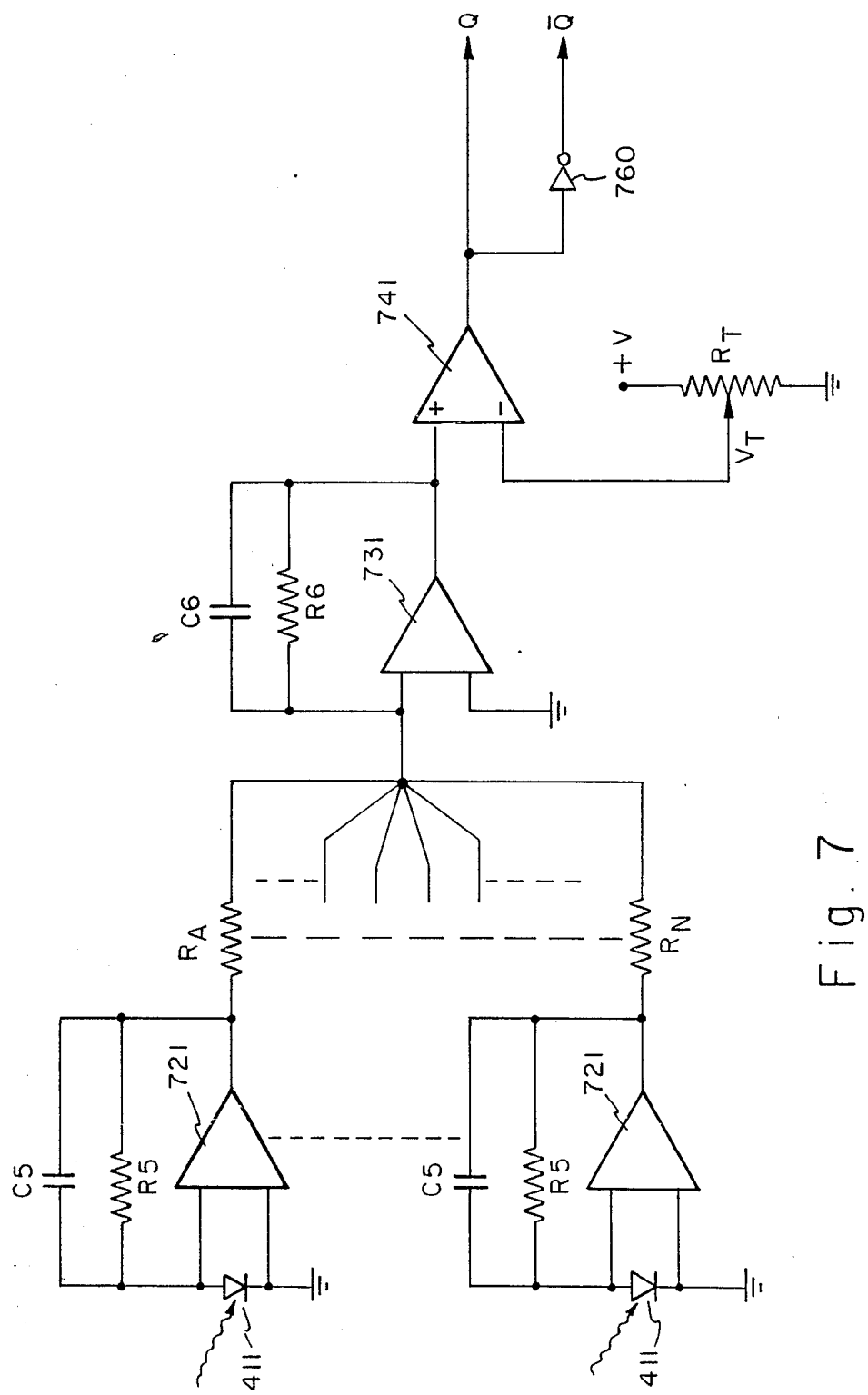
FIG. 7 is a schematic diagram of circuitry for generating a signal indicative of the presence or absence of X-rays received at the imaging system.

In the circuit of FIG. 6, the signal Q is a signal that is intended to be "on" during the time that light is being emitted from the screen 122 (FIG. 4), and to be "off" when light is no longer being substantially emitted from the screen 122. [The signal $\overline{Q}$ will be just the opposite.] Accordingly, Q and $\overline{Q}$ denote the presence and absence of X-ray exposure at the imaging system. If available and convenient, a signal can be alternatively derived from the X-ray source. In the described embodiment, a representative number of the photodiodes in the array are utilized to sense the presence of a minimum threshold of light received at the array. As illustrated in FIG. 7, a number of photodiodes from various representative positions of the array are used in obtaining the signal Q. Each of these photodiodes is coupled across the input of a respective operational amplifier 721, which has its positive input terminal grounded and resistor R5 and capacitor C5 coupled between the output and the negative input terminal of operational amplifier 721. The outputs of respective operational amplifiers 721 are coupled, via resistors $R_A, \ldots R_N$, to the negative input terminal of operational amplifier 731, which has its positive input grounded. Resistor R6 and capacitor C6 are coupled from the output of operational amplifier 731 to its positive input terminal. The output of operational amplifier 731 is coupled to the positive input terminal of a further operational amplifier 741, which is used as a comparator. The negative input of comparator 741 is held at an adjustable threshold, $V_T$, whose value is set by potentiometer $R_T$. The output of operational amplifier 741 is designated as the signal Q. Q is also applied to an inverter 760 to obtain $\overline{Q}$.

In operation of the circuit of FIG. 7, the light received by the photodiodes 411 results in the build-up of signal at the output of the respective operational amplifiers 721, and these signals are summed, via resistors $R_A, \ldots R_N$, at the input of operational amplifier 731. If the threshold $V_T$ is exceeded, the operational amplifier 741 will produce a "high" output (Q). On the other hand, if the threshold is not exceeded, the output of operational amplifier 741 will be "low", which will produce a "high" $\overline{Q}$. Referring to FIG. 8, there is shown a diagram of an embodiment of the circuit as disclosed in my above-referenced application Ser. No. 197,708 for reading out the signals stored in the storage capacitors C2 (FIG. 6) associated with the respective operational amplifiers 631 (first shown in FIG. 6). In the configuration of FIG. 8, there are n output rows (for example, 16 rows of a 16×16 array), and the columns are enabled for read-out, one at a time, under control of a processor subsystem 800, by providing enabling signals sequentially on the lines 811, 812, .... In the described embodiment, a microprocessor is conventionally provided with an input/output and display terminal, suitable memory, and clock circuitry (none specifically shown), and these comprise the processor subsystem 800 which controls operation of the system. The microprocessor may be, for example, a model 6809, sold by Motorola Corp., although any suitable general purpose processor or special purpose processor or circuitry may be employed. The output of the circuit associated with each photodiode of the array has a switch 831, which is a field-effect transistor in the present embodiment, which couples the output of operational amplifier 631 to a common row output line when an enable signal is applied to the gate of the switch 831. Thus, for example, when an enable signal is applied on the line 811, the signals at the outputs of the detector circuits of the first column of the array will be applied to their respective row output lines 851, 852, . . . These signals, representative of the stored light input received and integrated at the photodiode circuits of the first column of the array, are read into processor subsystem 800 via the respective analog-to-digital converters 861, 862, . . . When the next enable signal is applied on line 812, the stored signals of the photodiode circuits of the second column of the array are applied to their respective row output lines 851, 852, . . . , and are read into processor subsystem 800 via analog-to-digital converters 861, 862, . . . In this manner, the signals stored at by the light detection circuits are read into processor subsystem a column at a time. This reduces the number of connections to effect read-out, but it will be understood that any other suitable technique for obtaining the stored signals can be employed, including individual interrogation of each element of the array via a separate line.

Figure 9:
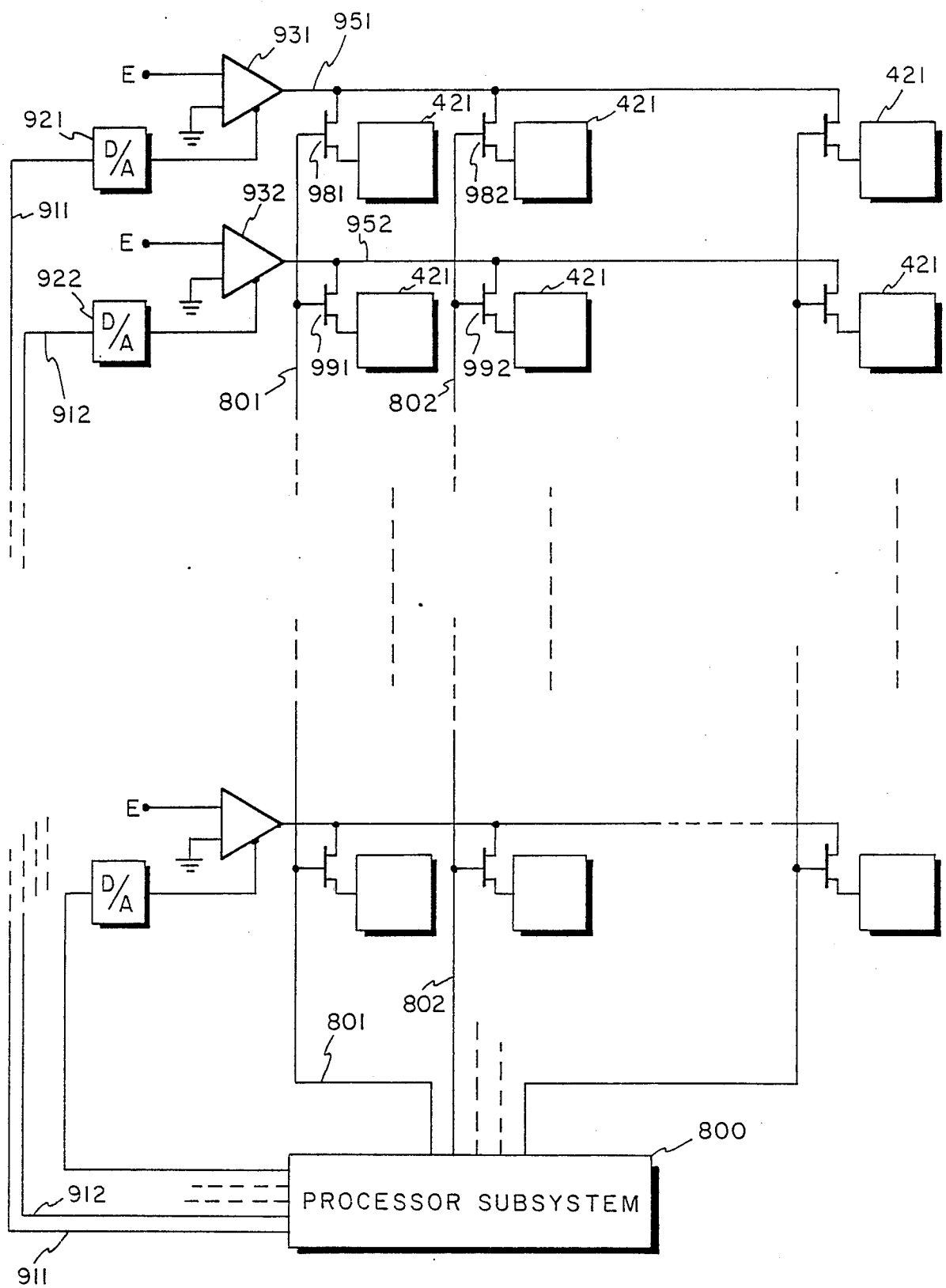
FIG. 9 is a schematic diagram, partially in block form, of an embodiment of a circuit for applying driving and control signals for light enhancement.

Referring to FIG. 9, there is shown a diagram of the circuitry (e.g. 423 in FIG. 5) for applying light enhancement drive and control signals in accordance with an embodiment as disclosed in my above-referenced application Ser. No. 197,708. Output control lines 911, 912, . . . , from processor subsystem 800, are coupled to respective digital-to-analog converters 921, 922, . . . , whose outputs are, in turn, coupled to the gain control inputs of driver amplifiers 931, 932, . . . The output of the driver amplifier 931 is coupled to each of the electroluminescent devices of the first row of the array, via respective switches 981, 982, . . . , which, in the disclosed embodiment, are field-effect transistors. Similarly, the driver amplifier 932 is coupled to each of the electroluminescent devices of the second row of the array via respective switches 991, 992, . . . , and so on. Column enable signals 801, 802, . . . , output from processor subsystem 800, are activated sequentially for a predetermined time. When a column enable signal is active, the signal is applied to the gates of all the field-effect transistors on that line, and turns on those transistors, so that the row driver signals applied by amplifiers 931, 932, . . . , are coupled to the respective light-emitting devices of the enabled column. During this time, the appropriate gain control signals are applied to amplifiers 931, 932, . . . , so that the intensity of light emitted by each electroluminescent device of the column is what was computed to be necessary to achieve the desired light enhancement. In this manner, and as will be described further hereinbelow in conjunction with the flow diagrams of FIGS. 12 and 13, the appropriate energizing signals are applied to each of the light emitting devices of the array.

Figure 10:
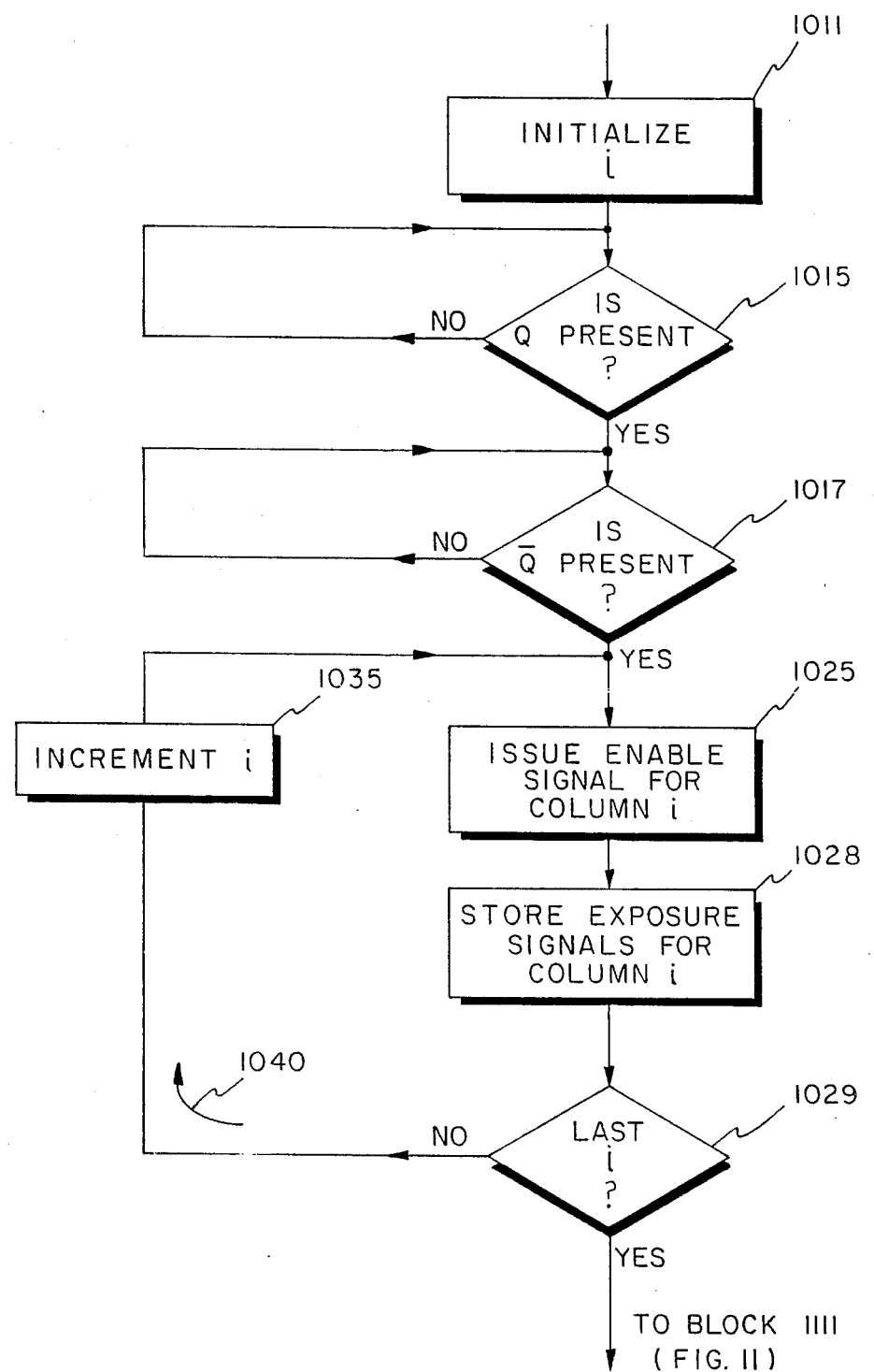
FIG. 10 is a flow diagram of a routine for controlling the reading and storage of signals representative of the light stored by the circuit associated with each light detecting element of an array of an embodiment of the invention.

Referring to FIG. 10, there is shown a flow diagram of the routine for controlling the reading and storage of the signals representative of the total light stored by the circuit associated with each light detecting element of the array. The block 1011 represents the initializing of the column index, i. The onset of the signal Q, which indicates that the X-ray procedure is occurring, is then awaited, as represented by diamond 1015. After Q has been received, the absence of Q (namely, $\overline{Q}$) is awaited (diamond 1017), which indicates that the X-ray procedure is terminated. The block 1025 is then entered, this block representing the issuing of an enable signal to a column enable line i (FIG. 8, lines 811, 812, . . . ), so that the signals stored by the capacitor C2 (FIG. 6) will be applied, via respective amplifiers 631, and analog-to-digital converters 861, 862, . . . , (FIG. 8) to the respective input lines of the processor subsystem 800. The received digital signals, representative of the measured light exposure, are then stored, as represented by the block 1028. Inquiry is then made (diamond 1029) as to whether the last column has been enabled. If not, the index i is incremented (block 1035), and the loop 1040 is continued until all the signals representative of the sensed light have been received and stored. The block 1111 of FIG. 11 is then entered.

Figure 11:
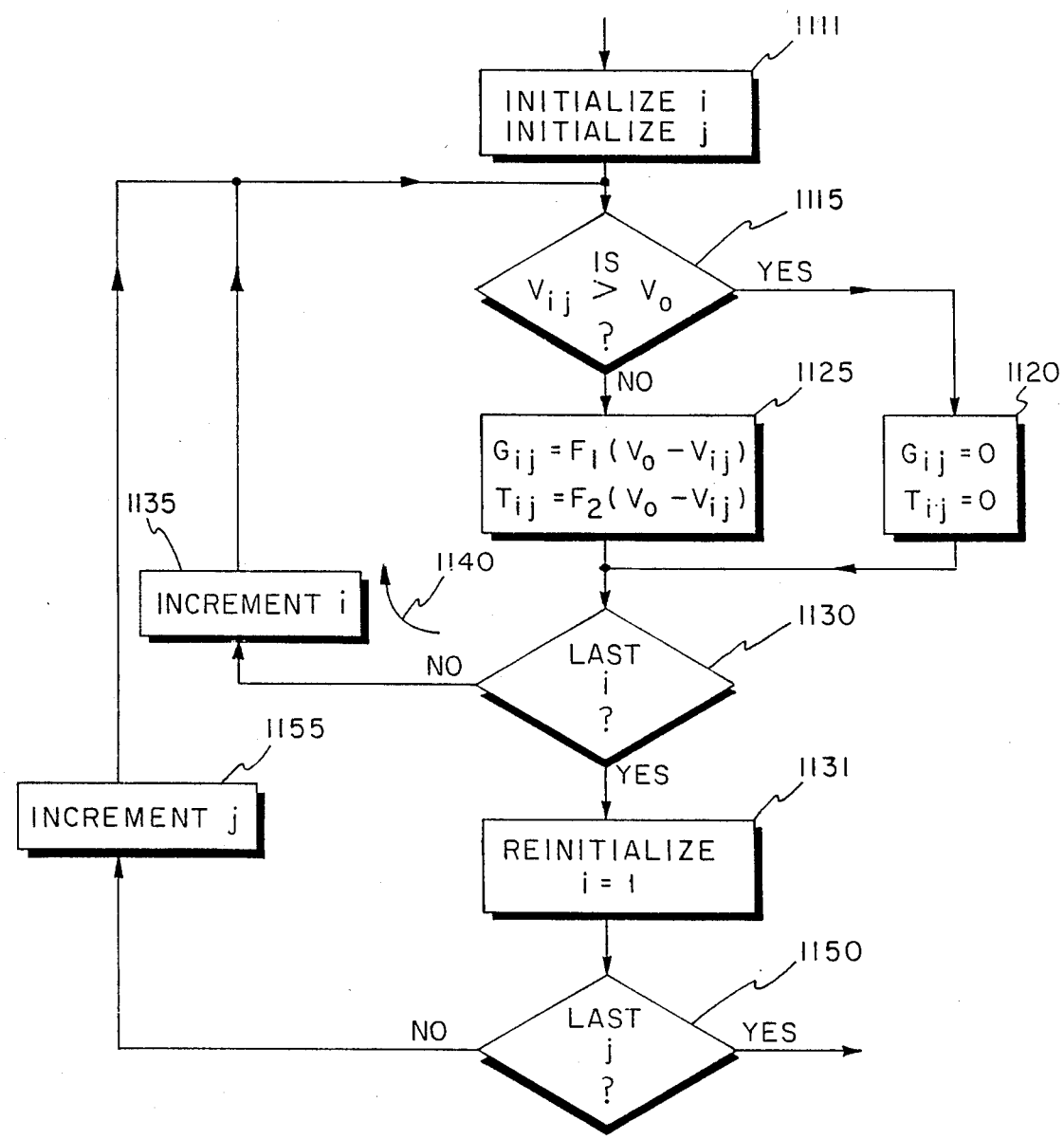
FIG. 11 is a flow diagram of a routine for computing the intensity and/or exposure time control signals for the light-emitting devices of an array of an embodiment as disclosed in my above-referenced application Ser. No. 197,708.

Referring to FIG. 11, there is shown a flow diagram of the routine for computing the intensity and/or exposure time control signals for the light-emitting devices 421 of the array (FIG. 5). The block 1111 represents the initializing of the column index i and the row index j for the stored exposure-representative signals. As previously described, each stored signal, (V1 in FIG. 6, and called $V_{ij}$ here) is representative of the cumulative X-ray exposure at an elemental position of the image (i,j) corresponding to an elemental region (i,j) of the detector array. Diamond 1115 is entered, and inquiry is made as to whether the stored signal, $V_{ij}$, is greater than $V_o$. If so, the accumulated light exposure at array position (i,j) is considered to be above threshold, and no light enhancement will be used at this array position. In such case, $G_{ij}$ is set equal to zero (block 1120). If the threshold is not exceeded, however, then the gain control for light enhancement is established as a function of the amount by which $V_o$ exceeds $V_{ij}$; that is $$G_{ij}=F_1(V_o-V_{ij})$$

The computation of this gain function is represented by the block 1125. As described hereinbelow, in an embodiment as disclosed in my above-referenced application Ser. No. 197,708, a light-emitting time control is utilized, in which event the exposure time of the emitted light is determined in accordance with a similar equation, as follows $$T_{ij}=F_2(V_o-V_{ij}).$$

In both cases, the gain or the exposure time, as the case may be, will be calibrated to provide the desired light exposure by the emitted light. The functions $F_1$ and $F_2$ may be, for example, a constant times $(V_o-V_{ij})$ or a suitable non-linear relationship which provides more light exposure monotonically for smaller $V_{ij}$.

Decision diamond 1130 is next entered (and is also entered from the output of block 1120), and inquiry is made as to whether the last i (column index) has been reached. If not, the index i is incremented (block 1135), and the loop 1140 is continued until gains or exposure times, as the case may be, are computed for each column of the particular array row (j) being processed. If so, however, decision diamond 1150 is entered, and inquiry is made as to whether the last j has been processed. If not, the block 1155 is entered, j is incremented, and the loop 1160 is continued until all rows have been processed.

Figure 12:
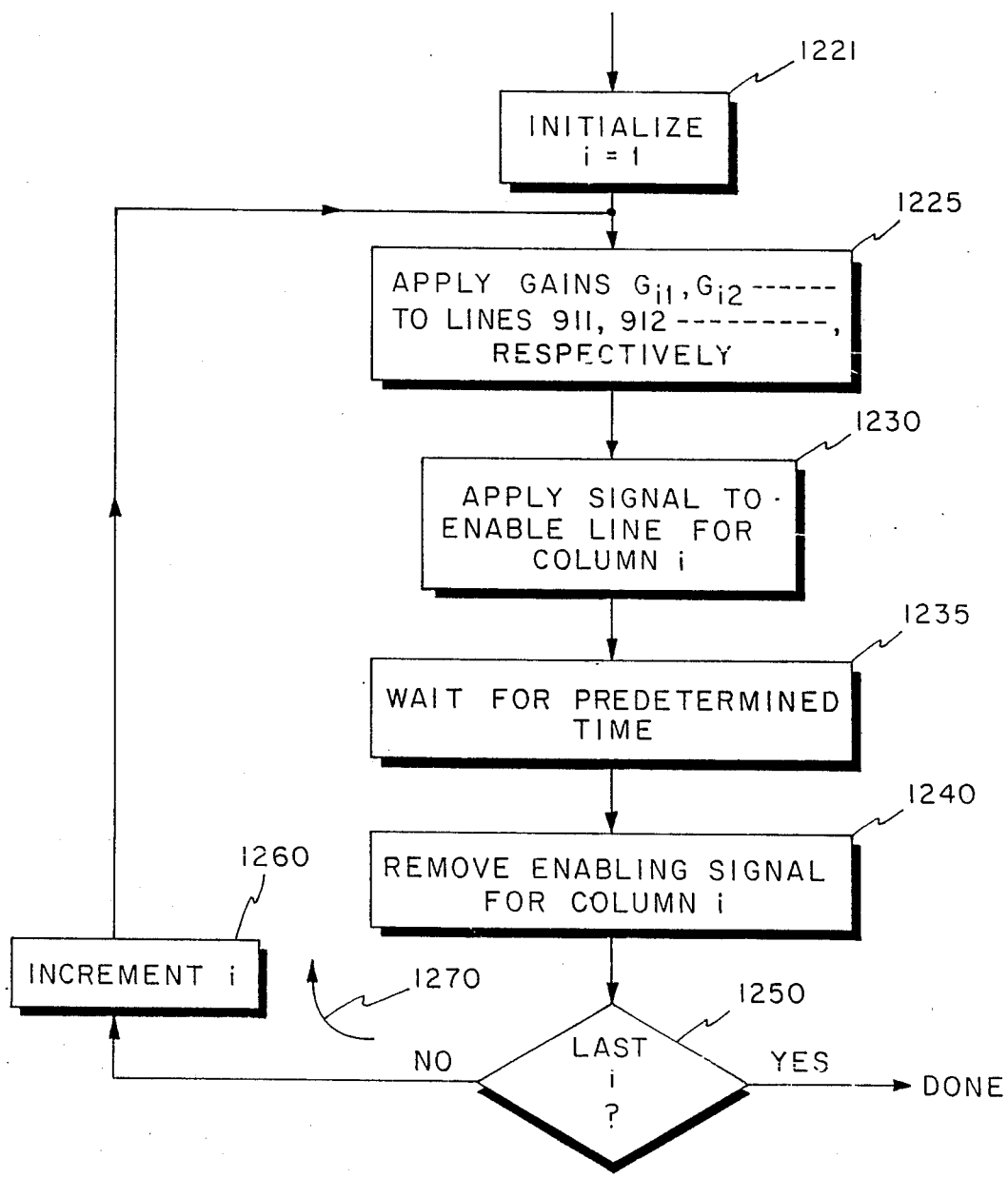
FIG. 12 is a flow diagram of a routine for applying energizing signals to the light-emitting devices of an array in accordance with an embodiment as disclosed in my above referenced application Ser. No. 197,708.

Referring to FIG. 12, there is shown an embodiment of a routine for applying the appropriate energizing signals to the light-emitting devices 421 of the array (FIG. 5). In this routine, the light-emitting devices are all energized for the same period of time, but with energizing signals having amplitudes which produce the respective desired light intensities at different elements of the array. The column index i is initialized, as represented by the block 1212. The previously computed gains $G_{i1}$, $G_{i2}$, ..., for the array elements of column i, are applied to the respective amplifiers 931, 932, ..., via the processor output lines 911, 912, ..., as represented by the block 1225. The block 1230 is then entered, this block representing the application of an enable signal to the column enable line for column i, which will cause the outputs of amplifiers 931, 932, ..., with suitable gains as just described, to be applied to the respective light-emitting devices of column i. For example, for the first column (i=1), an enable signal is applied to line 801 (FIG. 9). A predetermined waiting time is then permitted to elapse (block 1235) while the column of light-emitting devices are active, as represented by the block 1235. The time will depend on the type of light-emitting devices used and the range of energizing signals being applied. The enable signals are then removed (block 1240), and inquiry is then made (diamond 1250) as to whether all columns have been energized. If not, the index i is incremented (block 1260), and loop 1270 is continued until all columns of the array have been energized.

Figure 13:
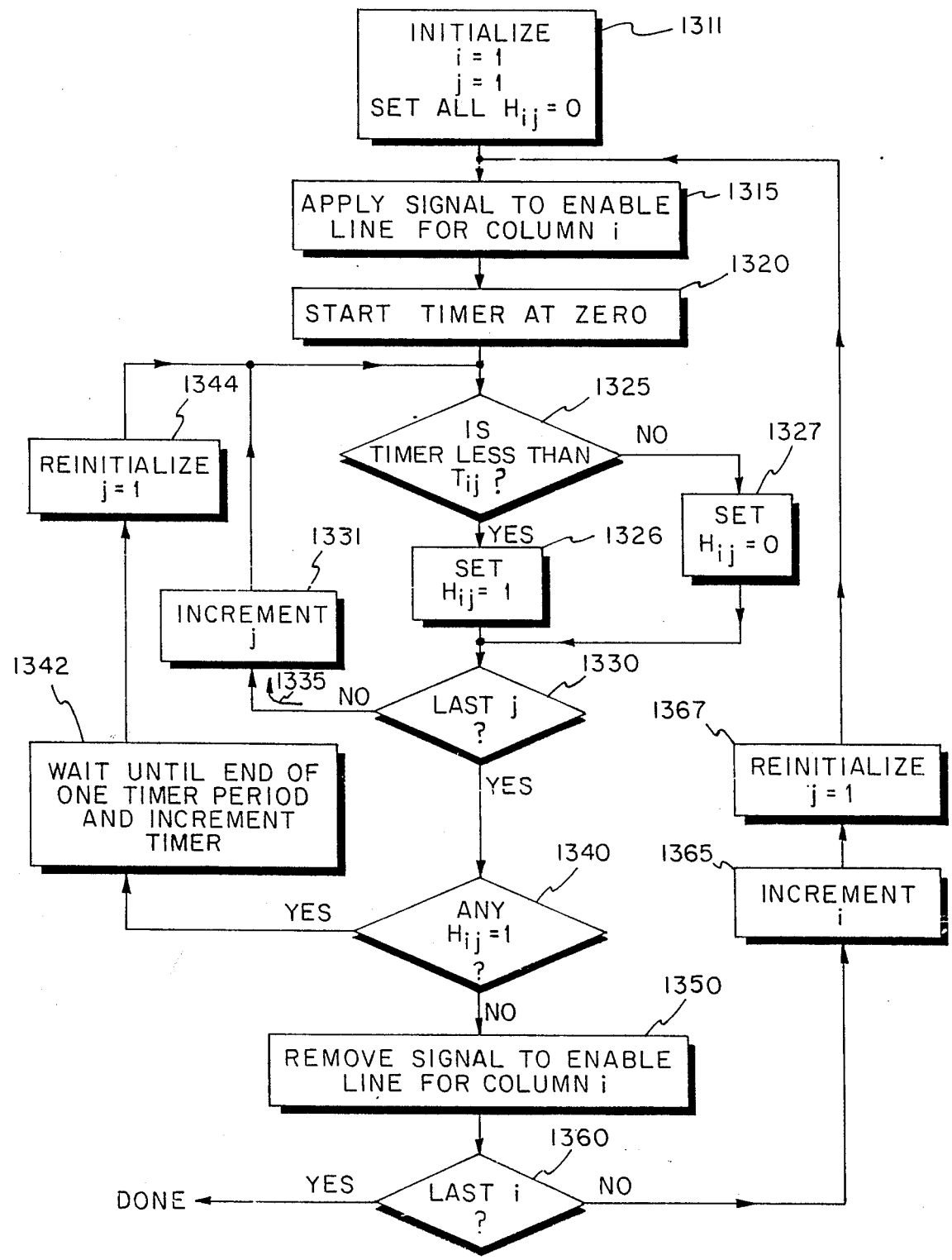
FIG. 13 is a flow diagram of a routine for energizing the light-emitting devices with a duty cycle that depends on a determined amount of enhancement light for each light-emitting device in accordance with an embodiment as disclosed in my above-referenced application Ser. No. 197,708.

FIG. 13 shows a routine that can be utilized for energizing all of the light-emitting devices with the same amplitude of energizing signal, but with a duty cycle that depends on the amount of enhancement light that was computed to be emitted from each light-emitting device.

In the flow diagram of FIG. 13, the block 1311 represents the initializing of the column and row indices, i and j, respectively, to 1, and the setting of all gains, $H_{ij}$ (via lines 911, 912, ..., in FIG. 9), to zero. [In the present embodiment, the gain control lines in FIG. 9 are used to control the amplifiers 931, 932, ..., by turning them on (as represented by a gain of "1"), or off (as represented by a gain of "0"). This representation is for convenience in describing operation of the embodiment of FIG. 9, and it will be understood that the lines 911, 912, ..., could just as easily be utilized to control switches for either passing or not passing the driver amplifier outputs so as to turn the light-emitting elements on or off.] The block 1315 is then entered, this block representing the applying of a signal to the enable line for column i (for example, to line 801 in FIG. 9, for i=1). The block 1320 is then entered, this block representing the starting of a timer that is utilized to keep track of the time that the light emitters of the current column have been enabled. Decision diamond 1325 is then entered, and inquiry is made as to whether the timer is less then the stored time Tij. During this first pass, the timer will be at zero. However, for some elements, the stored time Tij will also be zero (as described above, these being elements of the array at which no light enhancement is to be applied). For these elements, the answer to the inquiry of decision diamond 1325 will be "no", the block 1327 will be entered, and the gain $H_{ij}$ will be set to "0". However, for other elements, (at least, for the time being) the condition will be met, and the block 1326 will be entered. The block 1326 represents the setting of the gain for the element in row j (of the current column i) to "1". Diamond 1330 is then entered, and inquiry is made as to whether the last array element of the row (index j) has been reached. If not, j is incremented, and the loop 1335 is continued until gains of "1" or "0" have been set for each element of the current column. When the answer to the inquiry of diamond 1330 is "yes", decision diamond 1340 is entered, and inquiry is made as to whether any of the gains, $H_{ij}$, for the current column are "1"; in other words, for the current j, is the timer less then any $T_{ij}$? If so, there is still "on" time remaining for one or more elements of column i. In such case, the block 1342 is entered, this block representing the waiting until the end of one timer period, and the incrementing of the timer. The basic timer period can be any suitable incremental period, for example, 50 milliseconds. The row index, j, is then reintialized (block 1344), and diamond 1325 is again entered. This procedure is continued for the current column, i. As the timer increases, all elements of the column will eventually be turned "off" (viz., their gains set to "0"), at a time determined by each stored time, $T_{ij}$. When this happens, the block 1350 is entered, and the signal on the enable line for column i is removed. Inquiry is then made (diamond 1360) as to whether the last column has been processed. If not, i is incremented (block 1365), the index j is re-initialized at 1 (block 1367), and the block 1315 is entered. The same procedure is then implemented for the next column of elements of the light-emitting array, with each element being turned on for a time period that is determined by its stored time, $T_{ij}$. The same procedure is then followed for all columns of the array, in sequence, until all the enhancing light has been applied for the prescribed periods of time.

It will be understood that the procedure set forth in the embodiment of FIG. 13 makes use of circuitry, such as in FIG. 9, which requires only a single driver circuit for each row of the array. However, this means that the light is applied in sequence, and the procedure takes longer than if the entire array of light emitters is turned on (at appropriate elements) simultaneously. The maximum total time will typically only be a few seconds. However, if desired, the procedure could be implemented, for example, by having individual drivers for each element of the array, and individual control lines (or, for example, a column of control lines with suitable latches). As noted in my above-referenced application Ser. No. 197,708, various engineering approaches can be utilized to implement this and other parts of the invention; namely, the appropriate measurement of light at elemental regions in an image plane, and the selective application of enhancing light at appropriate elemental regions in the image plane.

Figure 14:
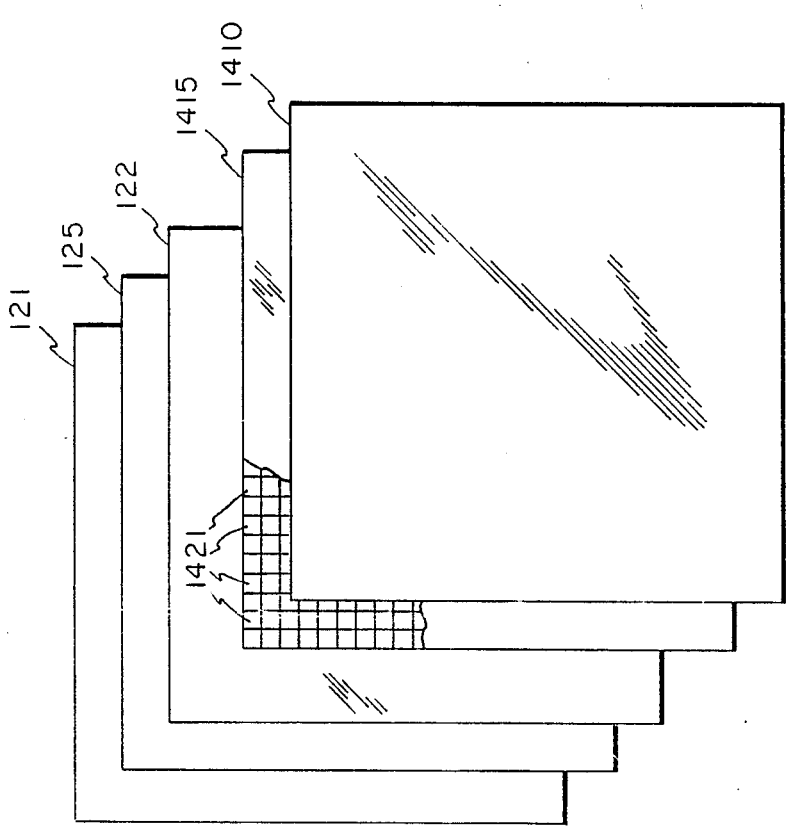
FIG. 14 is a diagram showing an exploded view of a portion of a light enhancement subsystem in accordance with a further embodiment as disclosed in my above-referenced application Ser. No. 197,708.

As disclosed in my above-referenced application Ser. No. 197,708, the light enhancement can also be selectively applied by utilizing a uniform light source that is appropriately modulated (in intensity and/or duty cycle) for each element of the array. This approach is shown diagrammatically in FIG. 14, wherein a substantially uniform field of light is provided, using one or more illumination sources 1410, such as a single large electroluminescent panel. A light modulating screen 1415 is provided. The screen has an array of elements 1421 corresponding to the elements 421 in the FIG. 5 embodiment. [If desired, the light detecting devices (not shown) can also be provided on the same screen, as in FIG. 5.] The modulating elements may be, for example, individual liquid crystal elements which act as individually controllable shutters for the light. In such case, the duty cycle of application of the signals can be used (as described in conjunction with the flow diagram of FIG. 13) to permit passage of light at each element for a time $T_{ij}$ that is determined by the computed amount of light equalization to be applied at that element. The driver signal would be operative, for example, to apply a signal to each element, for a time $T_{ij}$, which renders the liquid crystal transparent to light. Alternatively, electro-optical elements can be provided which transmit a controllable portion of the incident light at each element, depending upon the control signal applied at each element. The control signal can be in the form of the applied gain, $G_{ij}$, as previously described.

Figure 15:
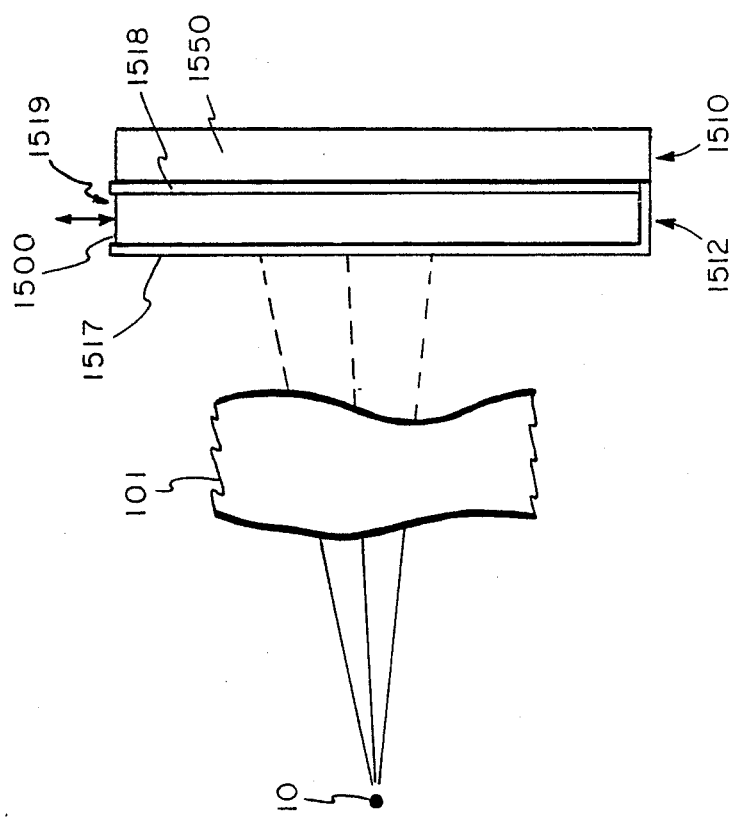
FIG. 15 is a diagram illustrating an embodiment as disclosed in my above-referenced application Ser. No. 197,708 wherein the light enhancement subsystem is mounted in a cassette holder which removably receives an X-ray film cassette.

Referring to FIG. 15, there is shown an embodiment as disclosed in my above-referenced application Ser. No. 197,708 wherein the light enhancement subsystem is part of a cassette holder assembly 1510 which removably receives a film cassette 1500 which may be of a standard configuration. The film cassette contains, for example, X-ray sensitive screens and a photographic film, as first shown in FIG. 1. The cassette-holding assembly includes a light-tight housing 1512, the front surface 1517 of which is transparent to X-rays, and the rear surface 1518 of which is light transparent so that light can be received through the light transparent back side of cassette 1500. The X-ray film cassette can be inserted in the slot 1519. Mounted behind the transparent rear surface of the slot is a light enhancement subsystem, for example, the sheet 430 of FIG. 5 and its associated circuitry. The light enhancement subsystem may be of any type described herein or that is consistent with the principles of the invention.

Figure 16:
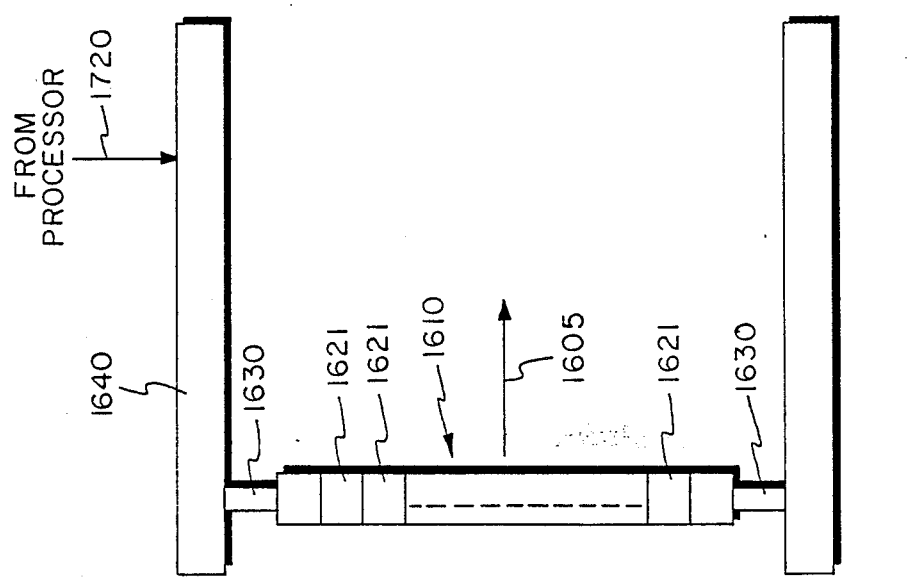
FIG. 16 is a diagram which illustrates a moveable one dimensional array utilized in accordance with the improvement of the present invention.

Referring to FIG. 16, there is shown an embodiment in accordance with the improvement of the invention which utilizes a one dimensional array 1610 of light emitters 1621 which generates the enhancing light a line at a time and is moved with respect to the light-sensitive film. [As used herein, the term "moved with respect to" means that either the array or the film or both can move.] Operation is similar to that described above with regard to a two dimensional array, but a one-dimensional array can be substantially less expensive. In the illustrated embodiment the array 1610 is a vertical array that is mounted on a support 1630 that is movable in the horizontal direction, as represented by arrow 1605. A horizontal array, or any other desired orientation could also be used. The support 1630 is slidable in tracks 1640, at least one of which contains suitable mechanical motive means such as a sprocket and chain drive.

Figure 17:
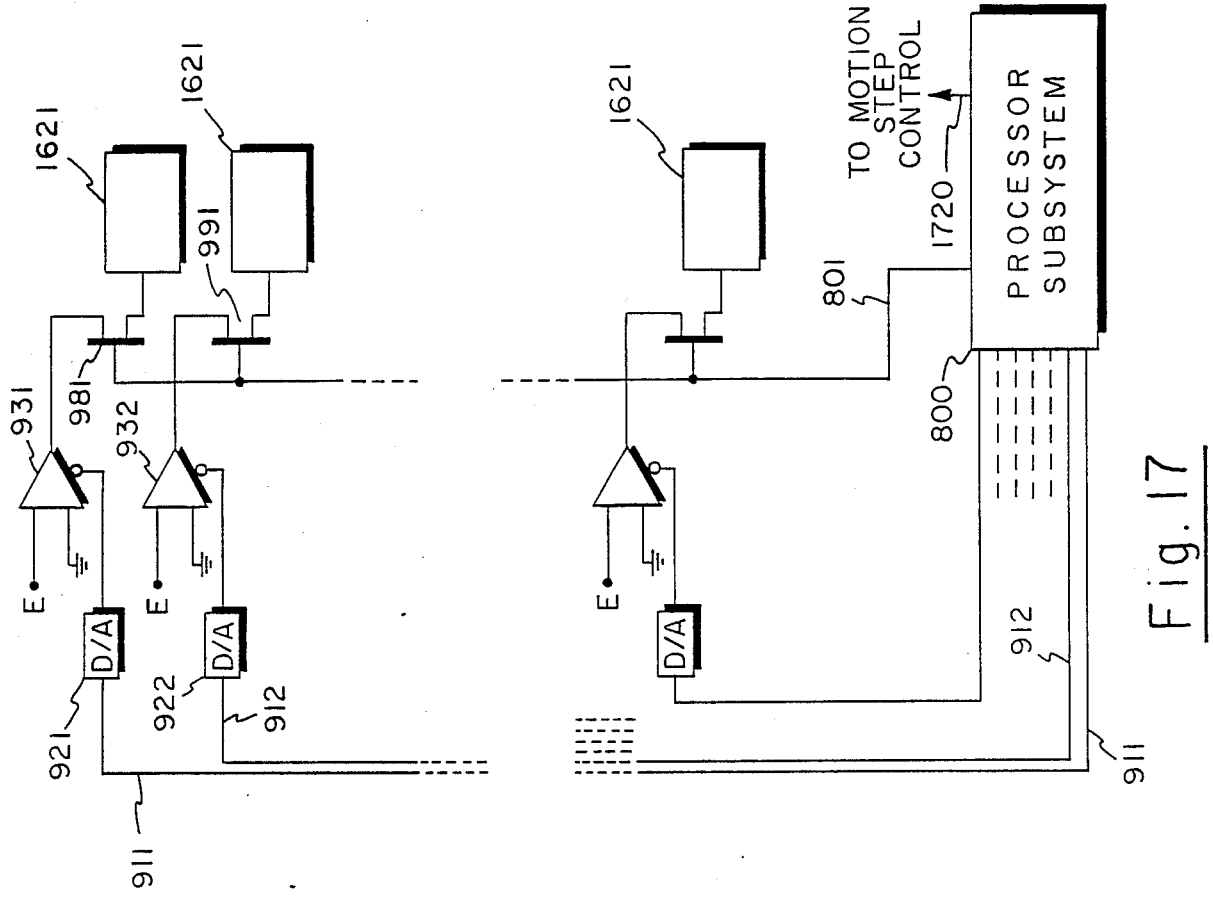
FIG. 17 is a schematic diagram, partially in block form, of an embodiment of a circuit for applying driving and control signals to the FIG. 16 array.

FIG. 17 illustrates the modification of the FIG. 9 arrangement which can be used to control the FIG. 16 embodiment. In this case, there is only a single vertical column of light emitting elements 1621. The individual elements 1621 are again driven by driver amplifiers 931, 932 . . . , and enabled by field-effect transistors 981, 982 . . . , which are controlled by line 801. In the present embodiment, the processor 800 issues motion step control signals, as indicated by line 1720 (also shown as input to track 1640 in FIG. 15).

Figure 18:
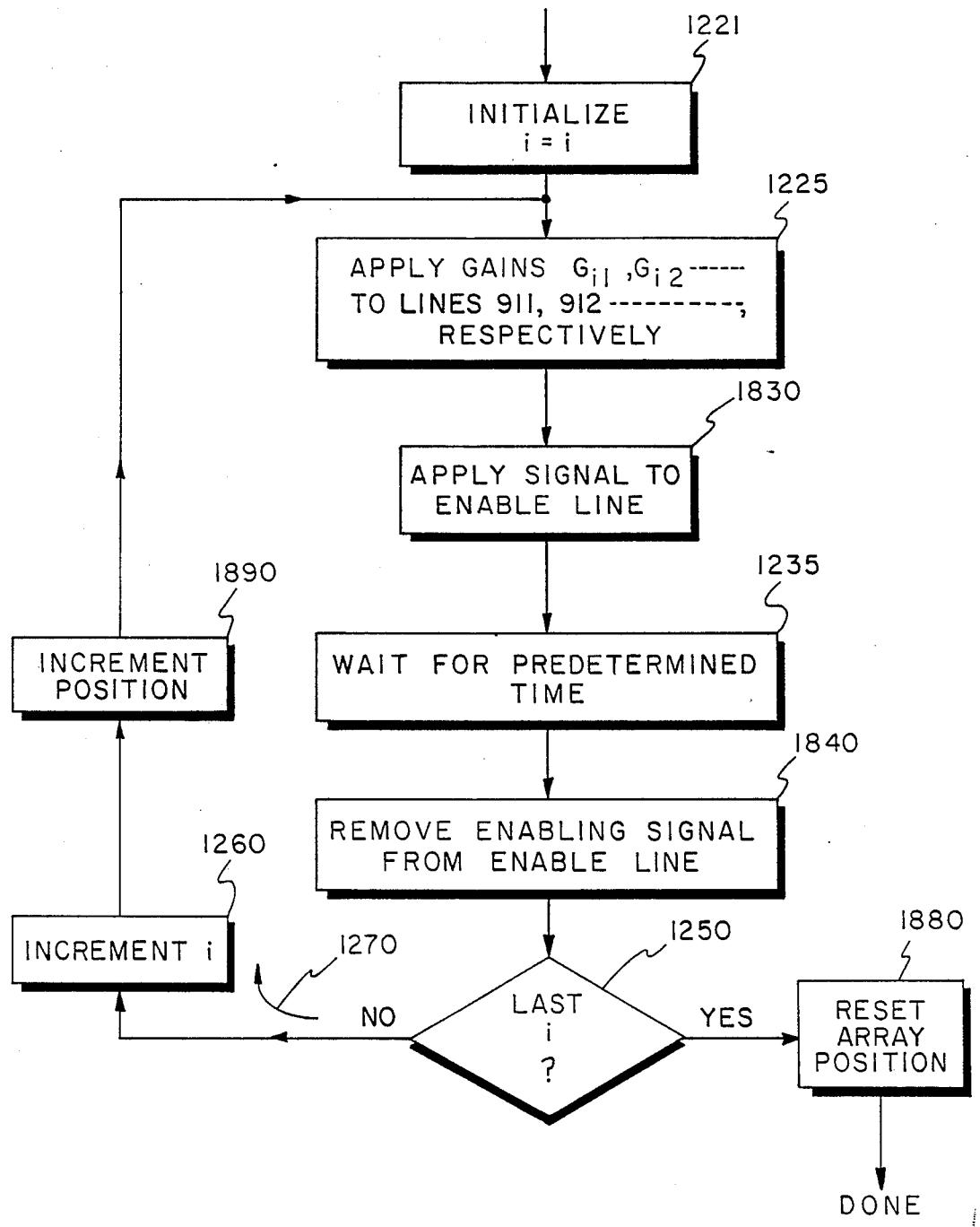
FIG. 18 is a flow diagram of a routine for applying energizing signals to the light emitting devices of the array of the FIG. 16 embodiment.

FIG. 18 shows the modification of the flow diagram of FIG. 12 (for application of enhancing light of intensity which depends on gains $G_{i1}$, $G_{i2}$, . . . , respectively) to control the processor subsystem 800 for use in conjunction with the embodiment of FIGS. 16 and 17. In FIG. 18 the blocks 1221, 1225, 1235, 1250, and 1260 are the same as in the flow diagram of FIG. 12. Blocks 1830 and 1840 reflect the difference from corresponding blocks 1230 and 1240 of FIG. 12 to the effect that there is only a single enable line in the FIG. 16 embodiment. The block 1890 represents the incrementing of the array position, this being done by issuance of a motion step control signal on line 1720 (FIG. 17). The block 1880 represents the resetting of the array position to its initial position after the last i has been reached.

Figure 19:
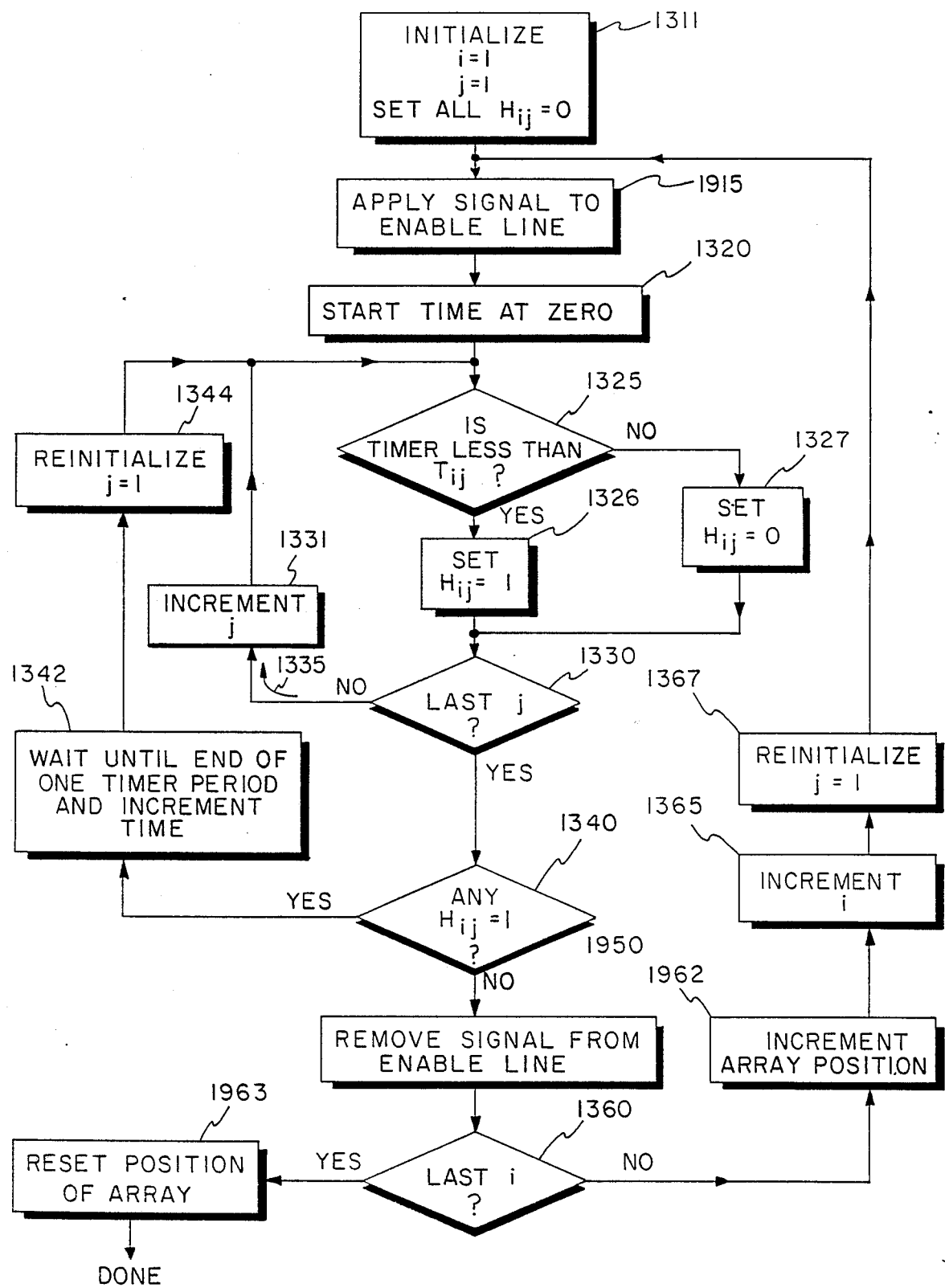
FIG. 19 is a flow diagram of a routine for energizing the light emitting devices of the FIG. 16 array with a duty cycle that depends on a determined amount of enhancement light for each light-emitting device.

FIG. 19 shows the modification of the flow diagram of FIG. 13 (for application of enhancing light for times which depend on $T_{ij}$) to control the processor 800 for use in conjunction with the embodiment of FIGS. 16 and 17. In the FIG. 19 embodiment all blocks starting with the digits 13 are the same as in the FIG. 13 embodiment. The blocks 1915 and 1950 are different than their counterparts 1315 and 1350 of FIG. 13 in that there is only a single enable line in the FIG. 19 embodiment. The block 1962 represents the incrementing of the array position, and the block 1963 represents the resetting of the array position to its initial position after the last i has been reached. The approach of FIG. 14, again using a one-dimensional array, could also be utilized.

The invention has been described with reference to particular preferred embodiments, but variations within the spirit and scope of the invention will occur to those skilled in the art. It will be understood that any suitable means for detecting the light from elemental regions of the X-ray sensitive film can be utilized, and any suitable means for producing the enhancing light, as a function of the detected light, can also be utilized. Further, it will be understood that other circuit means can be employed for coupling between the circuitry which detects light and the circuitry for generating the emitted light, and it is not necessary to employ a processor for this purpose. For example, an individual analog or digital (or combination) circuit can be employed for determining if the stored signal representative of light received from a given region is below a predetermined threshold, and, if so, for producing light of suitable intensity and duration, consistent with the teachings hereof.

I claim:

1. A method for producing a photographic image of an X-ray pattern, comprising the steps of:
    converting the X-ray pattern to a first pattern of light;
    exposing a photographic film to said first pattern of light;
    detecting the light at elemental regions of the first pattern;
    generating a second pattern of light in a pattern which depends on the detected light; and
    exposing said photographic film to said second pattern of light;
    said generating of said second pattern of light including generating light from a one-dimensional array of light emitters, and moving said array with respect to said photographic film.

2. The method as defined by claim 1, further comprising the step of developing said photographic film.

3. The method as defined by claim 1, wherein said step of detecting light at elemental regions of said first pattern of light comprises detecting the light intensity at said elemental regions; and wherein said step of generating a second pattern of light comprises generating a pattern of light having the following characteristics:
    (i) for elemental regions corresponding to elemental regions of the first pattern of light having a light intensity above a predetermined threshold, the light intensity of the respective elemental regions of the second pattern being substantially zero; and (ii) for elemental regions corresponding to elemental regions of the first pattern of light having a light intensity below the predetermined threshold, the respective elemental regions of the second pattern having intensities inversely related to the intensities of the corresponding elemental regions of the first pattern of light.

4. The method as defined by claim 1, wherein said step of detecting light at elemental regions of said first pattern of light comprises detecting the light intensity at said elemental regions; and wherein said step of generating a second pattern of light comprises generating a pattern of light having the following characteristics:
  (i) for elemental regions corresponding to elemental regions of the first pattern of light having a light intensity above a predetermined threshold, the light of respective elemental regions of the second pattern being present for substantially zero time; and
  (ii) for elemental regions corresponding to elemental regions of the first pattern of light having a light intensity below the predetermined threshold, the respective elemental regions of the second pattern having light which is present for times which are inversely related to the intensities of the corresponding elemental regions of the first pattern of light.

5. For use in a X-ray imaging system for obtaining an image of the X-ray transmissivity of a body, and including a source of X-rays directable at the body, at least one X-ray sensitive screen for receiving X-rays transmitted through the body and converting received X-rays to light, and means responsive to light from said screen for producing an image; a light enhancing subsystem, comprising:
  means for detecting the amount of light emanating from elemental regions of the X-ray sensitive screen; and
  means responsive to said detecting means for producing enhancing light to enhance the light from those elemental regions of the screen which are below a predetermined light threshold, said enhancing light also being received by said image producing means;
  said means for producing enhancing light including a one-dimensional array of light emitting devices that is moveable with respect to said image producing means.

6. The subsystem as defined by claim 5, wherein said means for producing enhancing light for enhancing the light emanating from at least some of said respective elemental regions is operative to produce an amount of light exposure on said image producing means that is in an inverse relationship to the amount of light detected by said detecting means from the respective corresponding elemental regions.

7. The system as defined by claim 6, wherein said light detecting means includes an array of light detecting devices.

8. A method for producing a photographic image of an X-ray pattern, comprising the steps of:
  converting the X-ray pattern to a first pattern of light;
  exposing a photographic film to said first pattern of light;
  generating a second pattern of light in a pattern which depends on the X-ray pattern and has the following characteristics:
  (i) for elemental regions corresponding to elemental regions of the X-ray pattern having an intensity above a predetermined threshold, the light intensity of the respective elemental regions of the second pattern being substantially zero; and
  (ii) for elemental regions corresponding to elemental regions of the X-ray pattern having an intensity below the predetermined threshold, the respective elemental regions of the second pattern having intensities inversely related to the intensities of the corresponding elemental regions of the X-ray pattern; and
  exposing said photographic film to said second pattern of light;
  said generating of said second pattern of light including generating light from a one-dimensional array of light emitters, and moving said array with respect to said photographic film.

9. The method as defined by claim 8, further comprising the step of developing said photographic film.

10. A method for producing a photographic image of an X-ray pattern, comprising the steps of:
  converting the X-ray pattern to a first pattern of light;
  exposing a photographic film to said first pattern of light;
  generating a second pattern of light in a pattern which depends on the X-ray pattern and has the following characteristics:
  (i) for elemental regions corresponding to elemental regions of the X-ray pattern having an intensity above a predetermined threshold, the light of respective elemental regions of the second pattern being present for substantially zero time; and
  (ii) for elemental regions corresponding to elemental regions of the X-ray pattern having an intensity below the predetermined threshold, the respective elemental regions of the second pattern having light which is present for times which are inversely related to the intensities of the corresponding elemental regions of the X-ray pattern; and
  exposing said photographic film to said second pattern of light;
  said generating of said second pattern of light including generating light from a one-dimensional array of light emitters, and moving said array with respect to said photographic film.

11. The method as defined by claim 10, further comprising the step of developing said photographic film.

12. An X-ray imaging system for obtaining a photographic image of the X-ray transmissivity of a body, comprising:
  a source of X-rays directable at the body;
  an X-ray imaging subsystem for receiving a pattern of X-rays transmitted through the body, including, in combination:
  at least one X-ray-sensitive screen for converting the pattern of X-rays to a first pattern of light;
  a light-sensitive film adjacent said screen for receiving said first pattern of light;
  an array of light detecting devices positioned to also receive said first pattern of light; and
  light generating means responsive to the outputs of said array of light detecting devices for generating a second pattern of light which is directed at and received by said light-sensitive film, said light-generating means including a one-dimensional array of light emitting devices that is movable with respect to said light-sensitive film;

whereby an image is formed on said light-sensitive film as a result of being exposed to said first and second patterns of light.

13. The system as defined by claim 12, wherein said array of light detecting devices is operative to detect light intensity at elemental regions of said first pattern of light, and wherein said light generating means includes means for generating a second pattern of light having the following characteristics:
 (i) for elemental regions corresponding to elemental regions of the first pattern of light having a light intensity above a predetermined threshold, the light intensity of the respective elemental regions of the second pattern being substantially zero; and
 (ii) for elemental regions corresponding to elemental regions of the first pattern of light having a light intensity below the predetermined threshold, the respective elemental regions of the second pattern having intensities inversely related to the intensities of the corresponding elemental regions of the first pattern of light.

14. The system as defined by claim 12, wherein said light detecting means includes an array of light detecting devices having the following characteristics:
 (i) for elemental regions corresponding to elemental regions of the first pattern of light having a light intensity above a predetermined threshold, the light of respective elemental regions of the second pattern being present for substantially zero time; and
 (ii) for elemental regions corresponding to elemental regions of the first pattern of light having a light intensity below the predetermined threshold, the respective elemental regions of the second pattern having light which is present for times which are inversely related to the intensities of the corresponding elemental regions of the first pattern of light.

* * * * *